US011665391B2

United States Patent
Kasugai et al.

(10) Patent No.: US 11,665,391 B2
(45) Date of Patent: May 30, 2023

(54) SIGNAL PROCESSING DEVICE AND SIGNAL PROCESSING SYSTEM

(71) Applicant: Panasonic Intellectual Property Management Co., Ltd., Osaka (JP)

(72) Inventors: Hiroki Kasugai, Osaka (JP); Shinichi Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/571,469

(22) Filed: Jan. 8, 2022

(65) Prior Publication Data

US 2022/0224970 A1 Jul. 14, 2022

(30) Foreign Application Priority Data

Jan. 13, 2021 (JP) .............................. JP2021-003745

(51) Int. Cl.
*H04N 21/439* (2011.01)
*H04N 21/2187* (2011.01)
(Continued)

(52) U.S. Cl.
CPC ......... *H04N 21/4394* (2013.01); *G06V 20/46* (2022.01); *G06V 20/49* (2022.01); *H04N 21/2187* (2013.01); *H04N 21/44008* (2013.01)

(58) Field of Classification Search
CPC ........... H04N 21/4394; H04N 21/2187; H04N 21/44008; G06V 20/46; G06V 20/49
See application file for complete search history.

(56) References Cited

U.S. PATENT DOCUMENTS

2009/0087161 A1* 4/2009 Roberts .................. H04N 5/262
386/285
2009/0094375 A1* 4/2009 Lection ................... G06F 15/16
709/231
(Continued)

FOREIGN PATENT DOCUMENTS

JP   H11-331827 A   11/1999
JP   2003-324698 A   11/2003
(Continued)

OTHER PUBLICATIONS

Office Action dated Apr. 27, 2021 issued in the corresponding JP application No. 2021-003745, with its machine translation by JPO.

*Primary Examiner* — Alazar Tilahun
(74) *Attorney, Agent, or Firm* — Renner, Otto, Boisselle & Sklar, LLP

(57) ABSTRACT

A signal processing device includes an input interface, an image processor, an audio processor, and a controller. The input interface receives signals of a video and an audio acquired concurrently in a space where subjects exist. The image processor recognizes subject images in the video, to determine a first type of area where each subject exists. The audio processor recognizes sound sources in the audio, to determine a second type of area where each sound source exists in the space, independently of the first type of area. The controller uses the first and second types of areas to judge coincidence or non-coincidence between a position of the each subject and a position of the each sound source, to determine a combination of a subject and a sound source whose positions coincide with each other. The controller selectively determines the subject image to be output that corresponds to the combination.

11 Claims, 15 Drawing Sheets

(51) Int. Cl.
 *H04N 21/44* (2011.01)
 *G06V 20/40* (2022.01)

(56) References Cited

U.S. PATENT DOCUMENTS

| | | | | |
|---|---|---|---|---|
| 2010/0189408 | A1* | 7/2010 | Itoh | H04N 21/4223 |
| | | | | 386/278 |
| 2013/0272548 | A1* | 10/2013 | Visser | G06V 10/454 |
| | | | | 382/103 |
| 2014/0314391 | A1* | 10/2014 | Kim | G11B 27/34 |
| | | | | 386/248 |
| 2016/0249134 | A1* | 8/2016 | Wang | H04R 3/005 |
| 2016/0358107 | A1* | 12/2016 | Kokkinis | G10L 21/028 |
| 2019/0215540 | A1* | 7/2019 | Nicol | H04N 21/4223 |
| 2020/0358415 | A1* | 11/2020 | Aoyama | H04S 7/302 |

FOREIGN PATENT DOCUMENTS

| | | |
|---|---|---|
| JP | 2010-154260 A | 7/2010 |
| JP | 2016-050872 A | 4/2016 |
| WO | 2020-085101 A1 | 4/2020 |

\* cited by examiner

SIGNAL PROCESSING DEVICE AND SIGNAL PROCESSING SYSTEM

CROSS REFERENCE TO RELATED APPLICATIONS

This application claims priority to Japanese Patent Application No. 2021-003745 filed on Jan. 13, 2021, the entire contents of which are herein incorporated by reference.

BACKGROUND

Technical Field

The present disclosure relates to a signal processing device and a signal processing system.

Related Art

In the case of performing live streaming, it is widely prevalent to achieve it by using inexpensive equipment such as PCs and digital cameras, instead of using expensive equipment used in broadcasting stations. There is also a need to switchingly select a video to be streamed from a plurality of videos, for transmission. Since it requires manpower, labor saving is also required.

JP 2003-324698A discloses a technique implementing equipment for streaming at low cost and enabling one-man stream switching.

In JP 2003-324698A, a technique is provided that saves labor in switching streaming, but it has not been able to achieve stream switching in an unmanned fashion. A widespread demand thus exists for a technique that achieves unmanned switching of videos in a suitable manner for viewers, without being limited to the live streaming service.

SUMMARY

The present disclosure provides a signal processing device and a signal processing system that achieve unmanned video switching in a suitable manner for viewers.

The signal processing device of the present disclosure comprises: an input interface that receives signals of a video and an audio acquired concurrently in a space where subjects exist; an image processor that recognizes subject images included in the video, to determine a first type of area where each subject exists; an audio processor that recognizes sound sources included in the audio, to determine a second type of area where each sound source exists in the space; and a controller that uses the first type of area and the second type of area to determine a combination of a subject and a sound source whose positions coincide with each other, the controller selectively determining the subject image to be output that corresponds to the combination.

The signal processing system of the present disclosure comprises: the above signal processing device; a plurality of imaging devices each imaging the space to generate a signal of the video; and a switcher for selecting a video including the selectively determined subject image, from among the videos output from the signal processing device and the plurality of imaging devices, the signal processing device comprising an imager that images a plurality of subjects lying in the space to create a video including a plurality of subject images, each of the plurality of imaging devices imaging an individual subject to create a video including an individual subject image, the controller of the signal processing device controlling the switcher to selectively output the subject image contained in the combination.

According to the present disclosure, there can be provided the signal processing device and the signal processing system that achieve unmanned video switching in a suitable manner for viewers.

DETAILED DESCRIPTION

Embodiments will now be described in detail with appropriate reference to the drawings.

First Embodiment

In a first embodiment, as an example of a signal processing device according to the present disclosure, a digital camera will be described that cuts out a subject image to be displayed or streamed based on the crop technology.

1. Configuration

Figure 1:
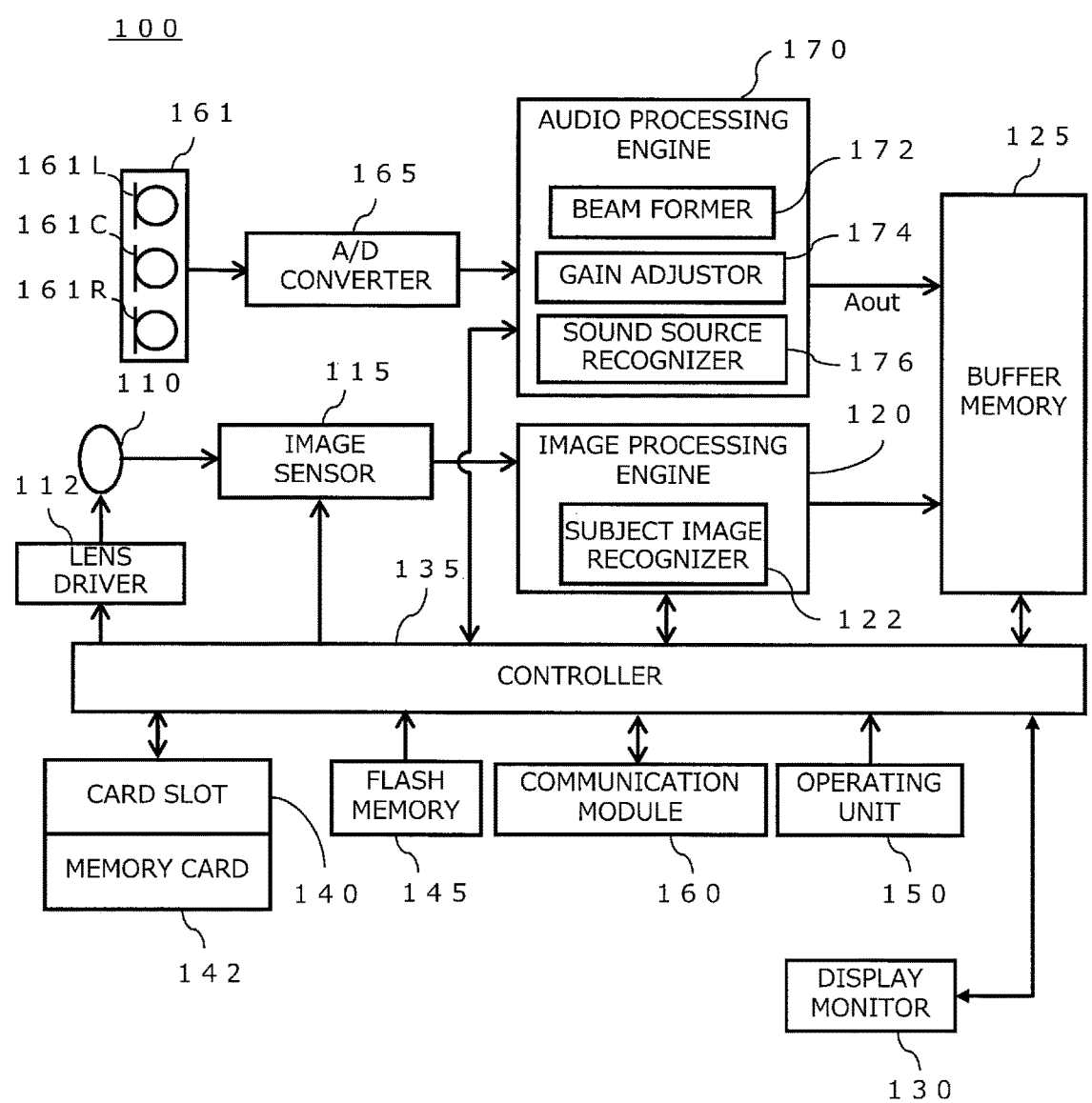
FIG. 1 is a hardware configuration diagram of an imaging device that is a first embodiment of a signal processing device.

FIG. 1 is a hardware configuration diagram of an imaging device 100 that is a first embodiment of the signal processing device. The imaging device 100 shown in FIG. 1 is a compact digital camera for example. The outline of constituent elements of the imaging device 100 will be described below.

The imaging device 100 of this embodiment comprises an image sensor 115, an image processing engine 120, a display monitor 130, and a controller 135. The imaging device 100 further comprises a buffer memory 125, a card slot 140, a flash memory 145, an operating unit 150, and a communication module 160. The imaging device 100 still further comprises a microphone 161, an analog-to-digital (A/D) converter 165 for microphone, and an audio processing engine 170. The imaging device 100 also comprises e.g. an optical system 110 and a lens driver 112.

The optical system 110 includes a focus lens, a zoom lens, a diaphragm, and a shutter. The focus lens is a lens for changing the focus state of a subject image formed on the image sensor 115. The zoom lens is a lens for changing the magnification of a subject image formed by the optical system. The focus lens, etc. are each composed of a single or a plurality of lenses.

The lens driver 112 drives the focus lens, etc. in the optical system 110. The lens driver 112 includes a motor to move the focus lens along an optical axis of the optical system 110 under the control of the controller 135. The configuration of the lens driver 112 to drive the focus lens can be achieved by e.g. a DC motor, a stepping motor, a servomotor, or an ultrasonic wave motor.

The image sensor 115 captures a subject image formed through the optical system 110, to generate captured data. The captured data constitutes image data representative of an image captured by the image sensor 115. The image sensor 115 generates image data of a new frame at a predetermined frame rate (e.g. 60 frames/sec). The timing to generate captured data and an electronic shutter action in the image sensor 115 is controlled by the controller 135. The image sensor 115 can be one of various image sensors such as a CMOS image sensor, a CCD image sensor, and an NMOS image sensor.

The image sensor 115 executes e.g. capturing actions of moving image, still image, and through image. The through image is mainly a moving image and is displayed on the display monitor 130 in order for the user to decide a composition for capturing a still image for example. The through image, the moving image, and the still image are each an example of the captured image in the embodiment. The image sensor 115 is an example of an imager of this embodiment.

By the image sensor 115 receiving external light incident through the optical system 110 such as lenses, the imaging device 100 can acquire e.g. a 4K resolution video and perform processing such as display and recording thereof. The "4 k resolution video" refers to a video of e.g. 4,096 pixels×2,160 pixels or 3,840 pixels×2,160 pixels. The "video" is typically moving images, but does not exclude still images.

The image processing engine 120 applies various processes to captured data output from the image sensor 115, to generate image data, and applies various processes to the image data, to generate images for display on the display monitor 130. Examples of the various processes include, but not exclusively, white balance correction, gamma correction, YC conversion process, electronic zoom process, compression process, and decompression process. The image processing engine 120 may be composed of a hard-wired electronic circuit or may be composed of a microcomputer, processor, etc. using a program.

The image processing engine 120 includes a subject image recognizer 122. The subject image recognizer 122 performs an image recognition process for video, to thereby implement a function to detect a subject image, such as a human face, a human body, or a musical instrument in the case of capturing a band video for example. To detect a subject image in the video, the subject image recognizer 122 utilizes a learned model in which machine learning has been performed using, as teacher data, shapes of images and/or contours of e.g. human faces and human bodies, shapes of images of musical instruments such as a guitar, a keyboard, and drums, and names of the shapes. Alternatively, the subject image recognizer 122 may detect each of the human faces, human bodies, and instruments through a rule-based image recognition process and output the result as detection information. The detection may be done by various image recognition algorithms. The detection information indicates the result of detection of the subject image and, in this embodiment, is information identifying an area in which the subject image exists in the video or information identifying the position of a pixel that represents the area. This enables the subject image recognizer 122 to detect e.g. that the subject image is a human face or a human body, or what kind of instrument the subject image is.

The display monitor 130 is a device capable of displaying various pieces information and can be e.g. a liquid crystal display device or an organic electroluminescent (EL) device.

The operating unit 150 is a general term for hard keys such as operation buttons and operation levers that are disposed on the exterior of the imaging device 100, and accepts user's operations. The operating unit 150 includes e.g. a release button, a mode dial, a touch panel, a cursor button, and a joystick. When accepting a user's operation, the operating unit 150 transmits an operation signal corresponding to the user's operation to the controller 135.

The controller 135 generates a control signal for selectively displaying at least one of one or more subject images included in a video. The control signal is a signal that instructs the image processing engine 120 to cut out one or more subject images included in a video. As alternative, the controller 135 generates and outputs a video selectively displaying one or more subject images. To that end, the controller 135 receives, from the image processing engine 120 and the audio processing engine 170, respectively, information identifying an area in which a subject exists in the video and information indicative of the position or the direction where each sound source exists.

The controller 135 includes a CPU or the like, the CPU running a program (software) to implement processes and functions according to the present disclosure. The controller 135 may include, instead of the CPU, a processor composed of a dedicated electronic circuit designed to implement given functions. That is, the controller 135 can be comprised of various processors such as the CPU, MPU, GPU, DSU, FPGA, and ASIC. The controller 135 may be configured from a single or a plurality of processors. The controller 135 may be configured, together with the image processing engine 120 and/or the audio processing engine 170, from a single semiconductor chip. In this specification, the controller 135 may be referred to as "controlling unit".

The buffer memory 125 is a recording medium functioning as a work memory of the image processing engine 120 and of the controller 135. The buffer memory 125 is comprised of a dynamic random access memory (DRAM) or the like. The flash memory 145 is a nonvolatile recording medium. Although not shown, the controller 135 may include various internal memories, for example, a built-in ROM. The ROM stores therein various programs run by the controller 135. The controller 135 may include a built-in RAM functioning as a work area of the CPU.

The card slot 140 is means receiving a detachable memory card 142. The card slot 140 enables electrical and mechanical connection of the memory card 142. The memory card 142 is an external memory having a recording element such as a flash memory disposed therewithin. The memory card 142 can store data such as image data generated by the image processing engine 120.

The communication module 160 is a communication module (circuit) communicating in accordance with the communication standard IEEE802.11 or Wi-Fi standard, etc. The imaging device 100 can communicate with other equipment via the communication module 160. The imaging device 100 may communicate directly with other equipment via the communication module 160 or may perform communication by way of access points. The communication module 160 may be connectable to communication networks such as Internet.

The microphone 161 is an example of a sound collector that collects sound. The microphone 161 converts collected sound into an analog signal in the form of an electric signal and outputs the signal. In examples shown in FIGS. 2 and 4 for example, the imaging device 100 includes three microphones 161L, 161C, and 161R. The microphone 161 may be composed of two microphone elements or of four or more microphone elements. In this specification, the plurality of microphone elements 161C, 161L, and 161R may be referred to as "microphone array 161".

The A/D converter 165 for microphone converts the analog signal from the microphone 161 into audio data in the form of a digital signal. The microphone 161 and the A/D converter 165 for microphone are an example of an audio acquisition device of this embodiment. The microphone 161 may include a microphone element lying outside of the imaging device 100. In this case, the imaging device 100 comprises, as the audio acquisition device, an interface circuit for the external microphone 161. The audio processing engine 170 receives audio data output from the audio acquisition device such as the A/D converter 165 for microphone and subjects the received audio data to various audio processes. The audio processing engine 170 is an example of an audio processor of this embodiment.

The audio processing engine 170 of this embodiment comprises, as shown in FIG. 1 for example, a beam former 172, a gain adjustor 174, and a sound source recognizer 176. The beam former 172 implements a function to control the audio directivity. The gain adjustor 174 performs a multiplication process of multiplying input audio data by a sound collection gain set by the controller 135 for example, to thereby achieve audio amplification. The method of implementing the function to control the audio directivity is as set forth hereinabove. The gain adjustor 174 may perform a process of suppressing audio by multiplying input audio data by a negative gain. The gain adjustor 174 may further have a function to change frequency characteristics and stereo characteristics of input audio data.

The sound source recognizer 176 performs a sound source recognition process for audio, to thereby implement a function to detect a sound source type, such as a human voice and sounds of musical instruments such as a guitar, a keyboard, and drums in the case of a band audio for example. To detect a sound source type in the audio, the sound source recognizer 176 utilizes a learned model in which machine learning has been performed using, as teacher data, human voices and sounds of musical instruments such as a guitar, a keyboard, and drums, and names of the sound sources. This enables the sound source recognizer 176 to detect e.g. that the sound source is a human voice or a guitar or a keyboard.

As above, in this embodiment, the example has been shown where the imaging device 100 is configured as a signal processing device. The signal processing device needs only to comprise at least an input interface (not shown) that receives outputs from the A/D converter 165 and the image sensor 115, the image processing engine 120, the audio processing engine 170, and the controller 135. In the case that the signal processing device has the A/D conversion function of the A/D converter 165, the signal processing device needs only to include an input interface that receives an analog signal output from the microphone 161.

2. Actions

Figure 2:
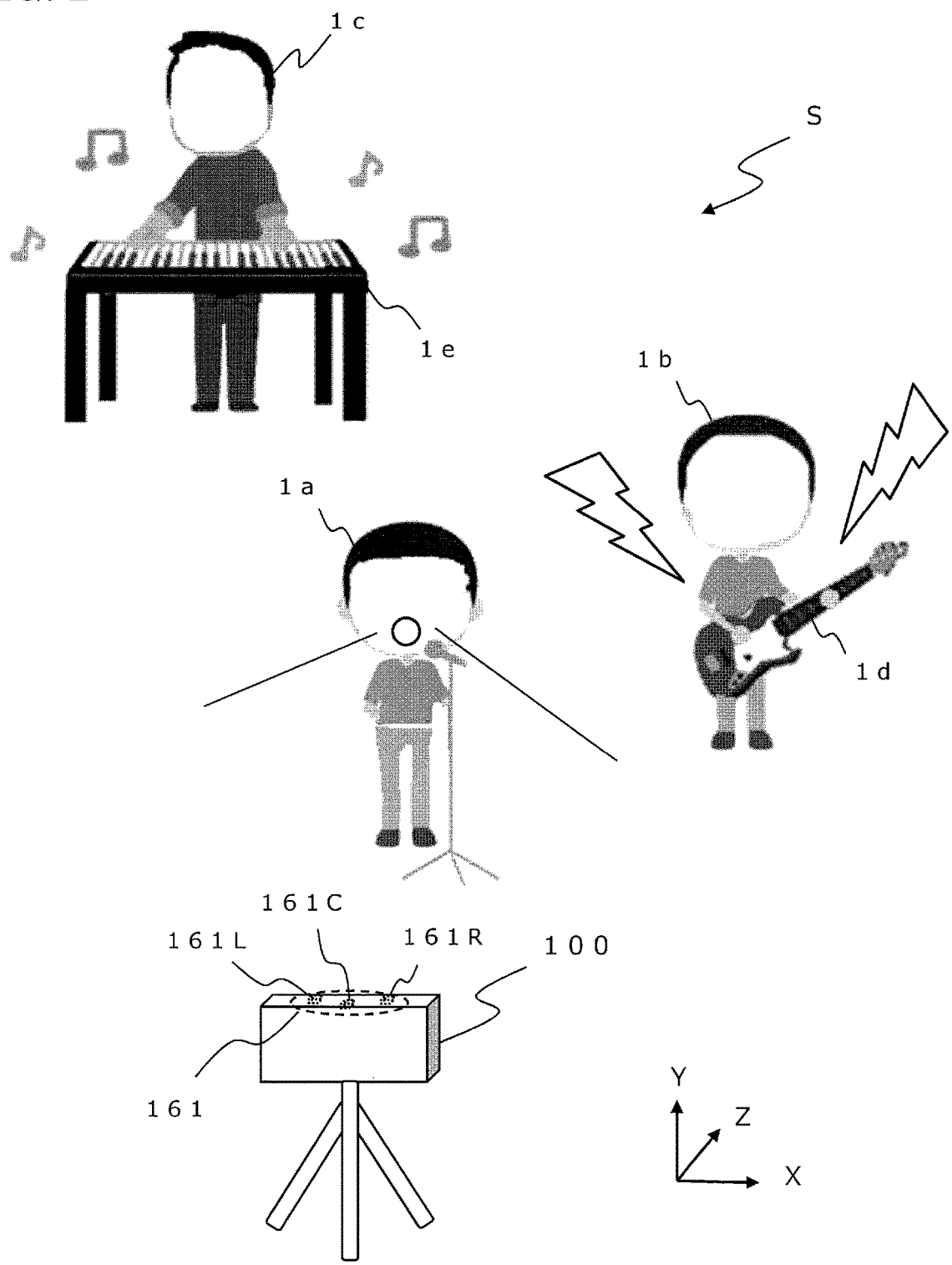
FIG. 2 is a view showing three members of a band playing in a space and the imaging device.

FIG. 2 shows the imaging device 100 and three members 1a to 1c of a band playing in a space S. For example, a video is live streamed that is being captured using the imaging device 100 fixed to a tripod in a live house. For convenience of explanation, the orthogonal XYZ coordinates are set such that: +X direction is the right-hand direction with respect to the direction from the back to the front of the imaging device 100; +Y direction is the vertically upward direction; and +Z direction is the depth direction in which the band exists when viewed from the imaging device 100.

An example will hereinafter be described in which the imaging device 100 images a band shown in FIG. 2 for live streaming.

Figure 3:
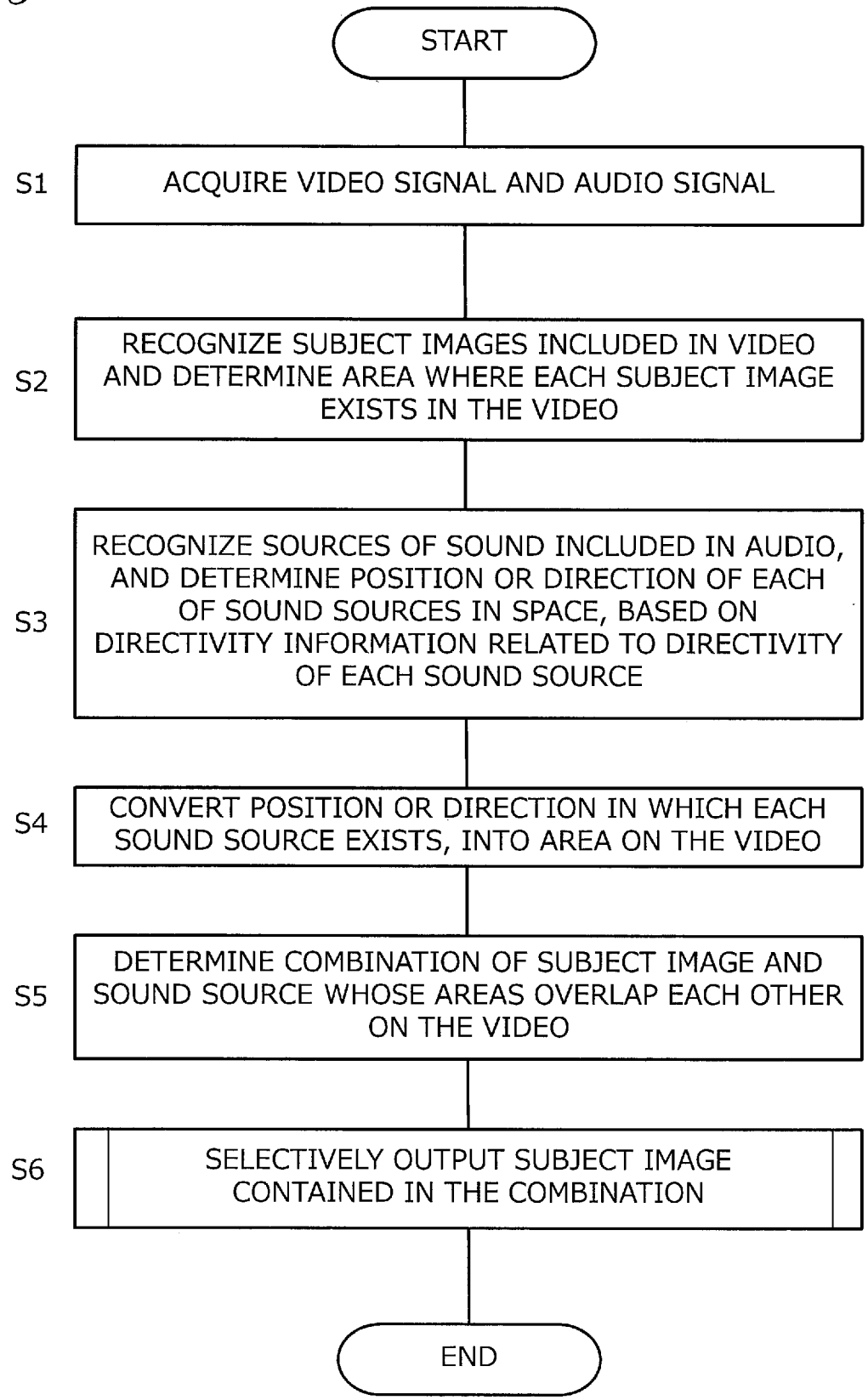
FIG. 3 is a flowchart showing a procedure of processes effected by the signal processing device shown in FIG. 1.

FIG. 3 is a flowchart of a procedure of a process of selectively switching among a plurality of subject images captured by the camera 100 and outputting the selected one.

At step S1, the image processing engine 120 acquires a video signal from the image sensor 115, and the audio processing engine 170 acquires an audio signal from the microphone 161. For example, the imaging device 100 uses the image sensor 115 to image a band, while using the microphone elements 161C, 161L, and 161R (microphone array 161) to acquire audio/music flowing through the space S.

At step S2, the image processing engine 120 recognizes subject images included in a video and determines an area where each subject image exists in the video.

In the example of FIG. 2, the imaging device 100 images the band members 1a to 1c as subject images. The imaging device 100 further images musical instruments such as a guitar 1d and a keyboard 1e as subject images. In this embodiment, the term "subject image" may be used as a general term of composite images of persons and musical instruments, that is, images of persons, images of musical instruments, and images of persons playing the musical instruments, included in the captured video.

The imaging device 100 performs image processing using the image processing engine 120 that has experienced machine learning, and recognizes each of one or more subject images existing in the entire video, to determine an area in which each subject image exists in the video. Although the "area" can be regarded as a set of plural pixels in which a subject image exists, one pixel representing the subject image may be regarded as a "pixel area". The "pixel area" can be identified as "coordinates" expressed by a vertical coordinate axis and a horizontal coordinate axis that are orthogonal to each other on a video. In this specification, such an area in which each subject exists in the video or in the space S is also referred to as "a first type of area".

At step S3, the audio processing engine 170 recognizes sources of sound included in an audio, and determines the position or the direction of each of the sound sources in the space, based on directivity information related to the directivity of each sound source.

In this embodiment, persons uttering a voice and musical instruments making a sound are collectively called "sound source".

Figure 4:
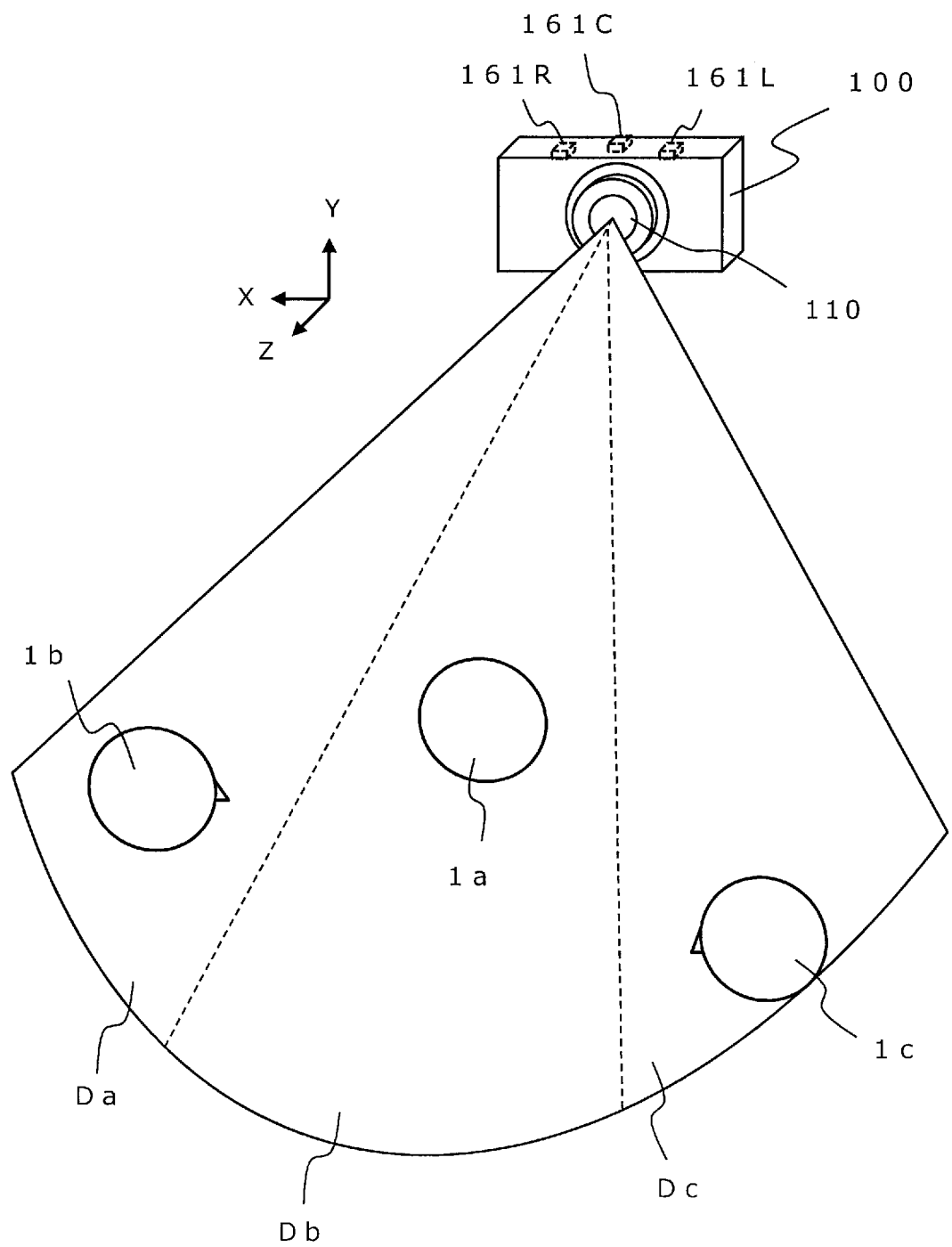
FIG. 4 is a view showing the three members of the band playing in the space and the imaging device.

When acquiring an audio, the imaging device 100 determines the position or the direction in which each sound source exists in the space S. FIG. 4 shows an example of directions Da, Db, and DC in each of which a sound source exists, correlated with imaging ranges. Although the directions Da, Db, and DC are each "a single direction" defined typically by a straight line, the "direction" as used herein may be defined as "a range" including the straight line.

Various methods are conceivable for determining the position or the direction in which each sound source exists. In the case of using the microphone array 161 for example, the imaging device 100 can estimate the position or the direction in which each sound source exists, by utilizing the relationship of a slight difference in time of arrival of a sound at each of the microphone elements 161C, 161L, and 161R when each microphone element receives the same sound. Such estimation is a technique known as arrival direction estimation. Alternatively, in the case that the direction/position of an audio to pick up is set in advance in each of the microphone elements 161C, 161L, and 161R, it is possible to determine the position or the direction in which each sound source exists, depending on which one of the microphones 161C, 161L and 161R has acquired sound. Also in the case of controlling the sound collection directivity of the microphone array 161 by a known method, it is possible to determine the position or the direction in which each sound source exists in the space S. In each example, information for determining the position or the direction of a sound source is known in advance, such as e.g. information on physical arrangement of the microphone array, information on directivity of each microphone, and information on time and directivity. In this specification, such pieces of information are referred to as "directivity information". By using the directivity information, the imaging device 100 can determine the position or the direction in which each sound source exists.

At step S4, the controller 135 converts' the position or the direction in which each sound source exists, into an area on a video. In this specification, such an area in which each sound source exists in the video or in the space S is referred to as "a second type of area". In this embodiment, the imaging device 100 performs processing by utilizing coincidence or non-coincidence between the number of subject images and the number of sound sources. To perform the processing, the imaging device 100 performs a process of converting the position or the direction in which each sound source exists, into an area on a video.

Figure 5:
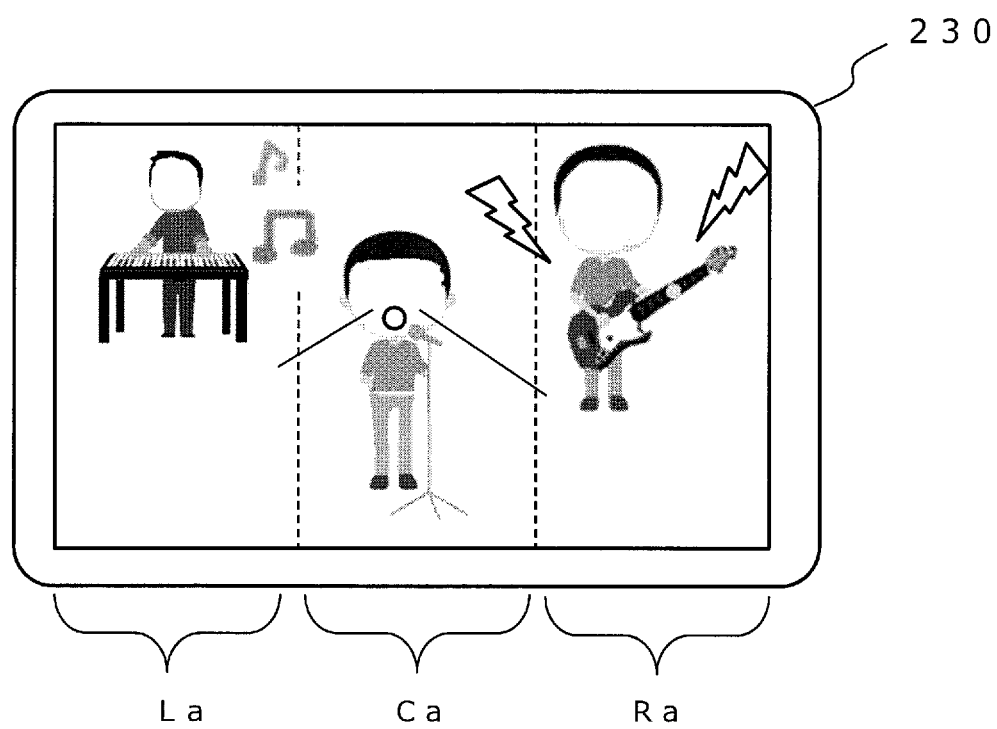
FIG. 5 is an explanatory view of a process of correlating the position of a sound source with an area on a video.

FIG. 5 is a view for explaining a process of correlating the position of a sound source with an area on a video. The space S shown in FIG. 2 is imaged, with various subject images being displayed on an external display device 230 for example. The external display device 230 can be a display monitor disposed at a live streaming destination, etc. Although in the following description the subject images are displayed on the display device 230, this is an example. The subject images may be displayed on the display monitor 130 of the imaging device 100.

The directions Da, Db, and Dc of the sound sources exemplified in FIG. 4 can be respectively correlated with a right side area Ra, a central area Ca, and a left side area La (FIG. 5) that are obtained when dividing the video into three by e.g. perpendicular lines parallel to the Y axis. In this specification, such processing is referred to as "convert" the position or the direction defined on the three-dimensional space S into an area on a two-dimensional video.

At step S5, the controller 135 determines a combination of a subject image and a sound source whose areas overlap each other on the video. And, at step S6, the controller 135 generates a control signal for selectively outputting a subject image contained in the combination. For example, the generated control signal is transmitted from the controller 135 to the communication module 160 and is output to the outside via the communication module 160 acting as an output interface of the imaging device 100. Although in this embodiment, as above, the output destination is a device as the live streaming destination, it may be the display monitor 130 of the imaging device 100.

Figure 6:
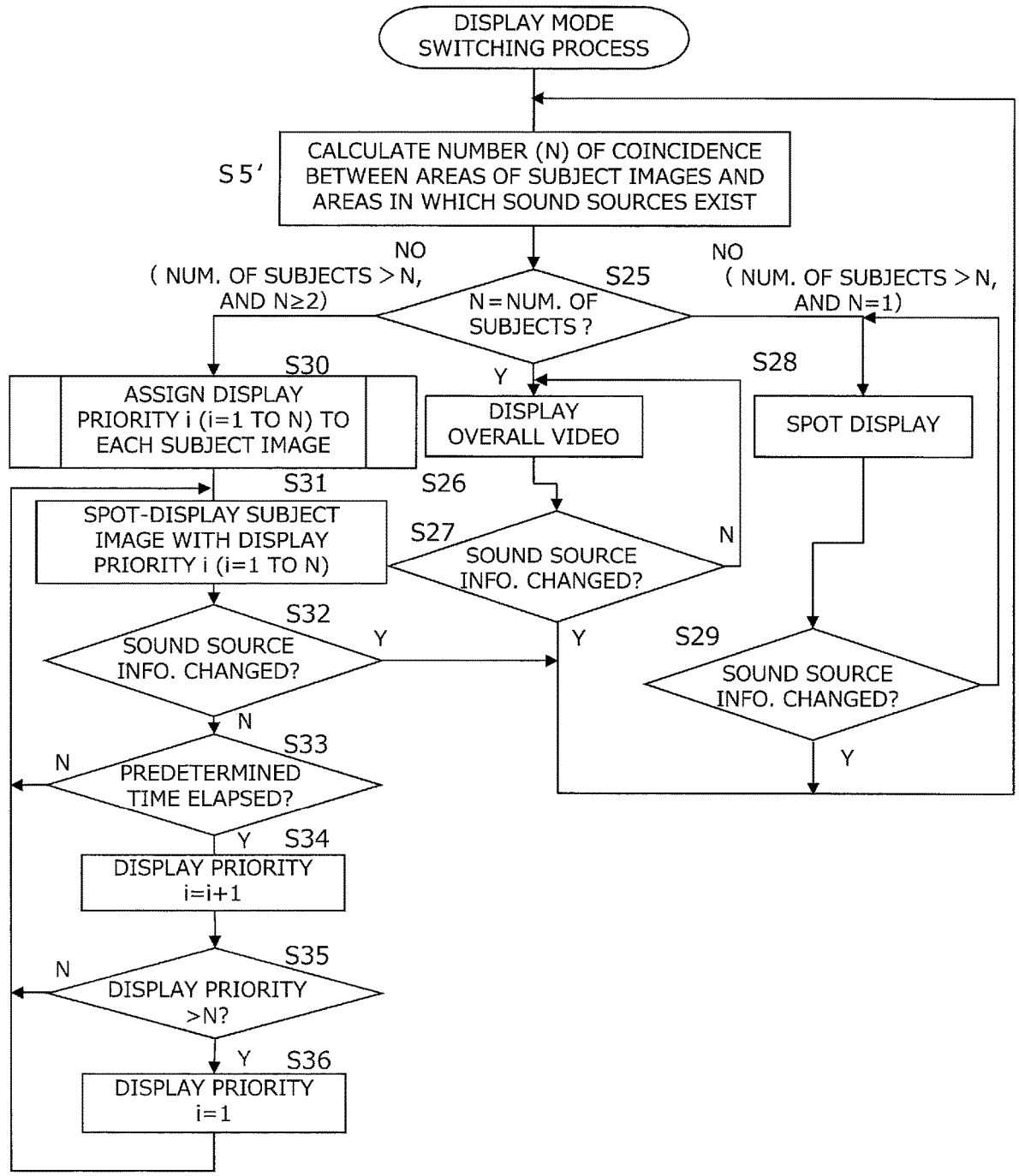
FIG. 6 is a flowchart showing a procedure of a display mode switching process effected by the signal processing device.
Figure 7:
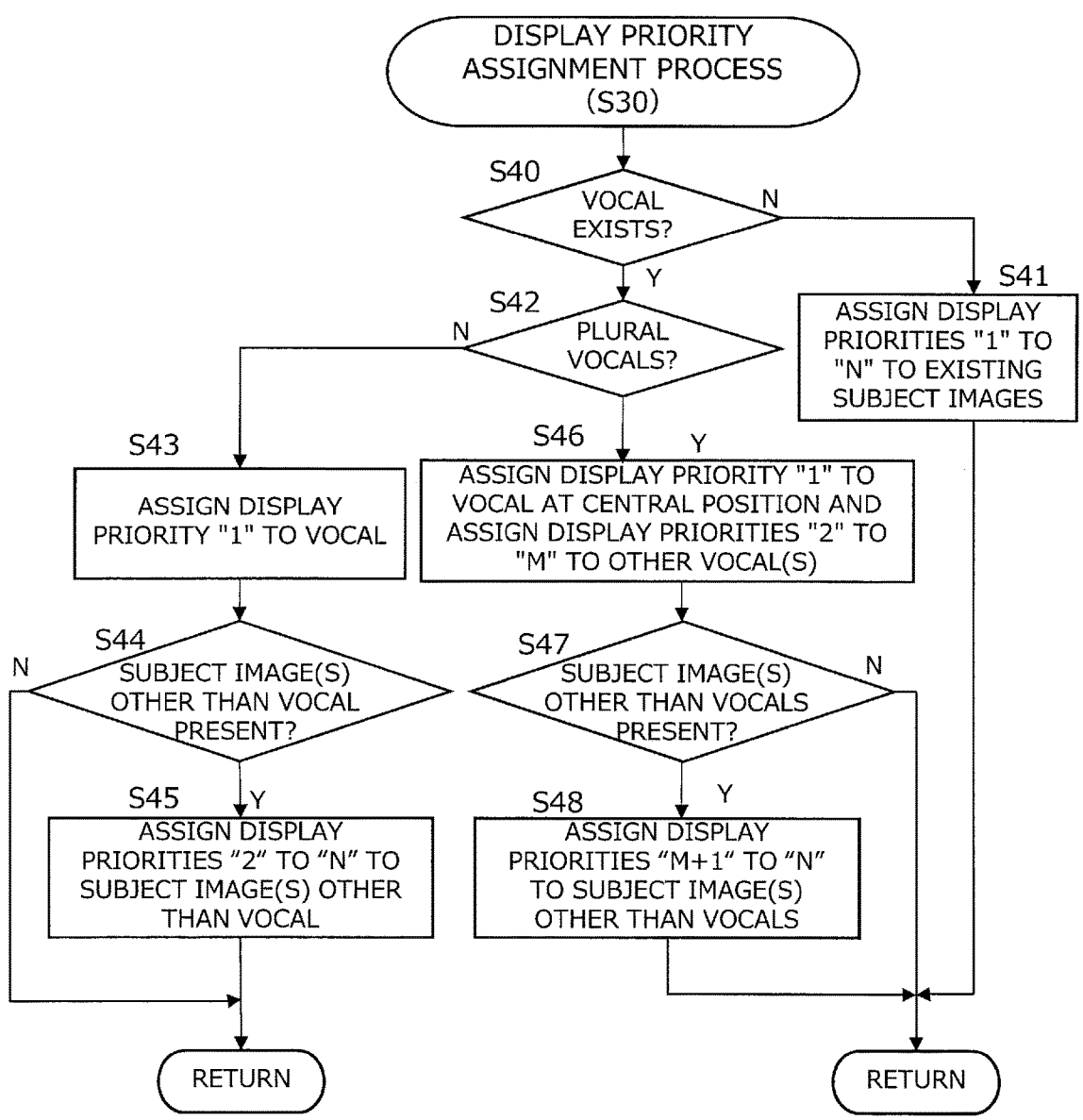
FIG. 7 is a flowchart of a subroutine showing a detailed processing procedure of a display priority assignment process.

Referring then to FIGS. 6 and 7, a more specific description will be given of processing effected by the signal processing device (imaging device 100 in this embodiment) for switching the display mode.

FIG. 6 is a flowchart of a procedure of a display mode switching process at steps S5 and S6 of FIG. 3. At step S5' (FIG. 6) corresponding to step S5, the controller 135 calculates, as the number of combinations of a subject image and a sound source whose areas overlap each other on a video, the number (N) of coincidence between areas of subject images and areas in which sound sources exist.

Figure 8:
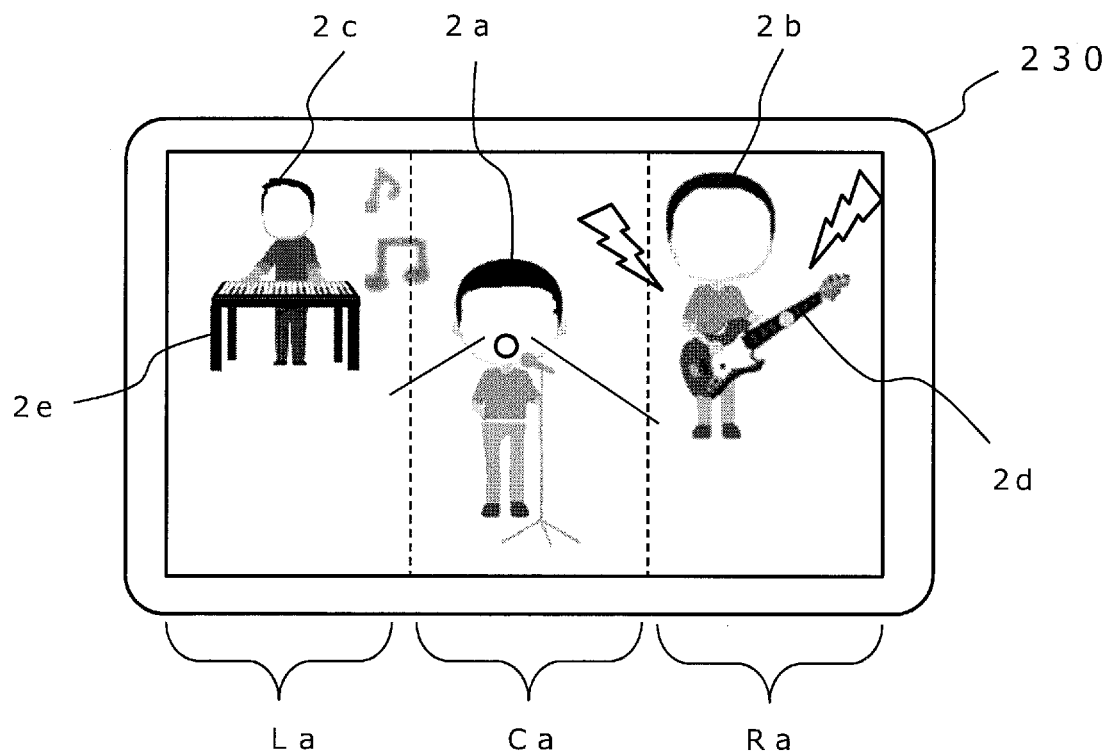
FIG. 8 is a view showing an example of a video captured by the imaging device.

FIG. 8 shows an example of a video captured by the imaging device 100. The display device 230 is displaying subject images 2a to 2e respectively corresponding to the band members 1a to 1c, the guitar 1d, and the keyboard 1e. Upon capturing the video of FIG. 8, the member 1a is singing, the member 1b is playing the guitar 1d, and the member 1c is playing the keyboard 1e. The display device 230 is displaying five subject images of the members 1a to 1c and the musical instruments 1d and 1e. The imaging device 100 treats as one subject image the combination of two subject images 2b and 2d that exist close to each other, more specifically, that exist within a predefined distance on the image. Similarly, the imaging device 100 treats the combination of two subject images 2c and 2e as one subject image. Thus, in the example of FIG. 8, the imaging device 100 finally recognizes three subject images. And, since singing, playing the guitar, and playing the keyboard are being performed, the number of sound sources is three at this time.

According to the conversion process described earlier with reference to FIG. 5, the imaging device 100 can recognize the following matters: i.e., that the three sound sources exist in the left side area La, the central area Ca, and the right side area Ra on the video; and that the three subject images on the video, i.e., the subject image 2a, the combination of the subject images 2b and 2d, and the combination of the subject images 2c and 2e exist in the central area Ca, the right side area Ra, and the left side area La, respectively. In this embodiment, the number of coincidence between areas each including a subject image and areas each including a sound source is referred to as "coincident number".

At step S25 of FIG. 6, the controller 135 determines whether the coincidence number is equal to the number of subjects, and, if negative, further determines whether N is 1 or 2 or more. If the coincidence number is equal to the number of subjects, the process goes to step S26. If the coincidence number is not equal to the number of subjects and if N is 1, the process goes to step S28. If the coincidence number is not equal to the number of subjects and if N is 2 or more, the process goes to step S30.

At step S26, the controller 135 generates a control signal for displaying an overall video. This is because, since the coincidence number is equal to the number of subjects, it is meant that all of the subjects are outputting an audio or a sound as sound sources.

In the above example, the coincidence number is 3, which is equal to the number of regions in each of which a subject image exists. As a result, the imaging device 100 can determine that all of the subjects are uttering or playing as sound sources. The imaging device 100 displays a video so as to include all of the three subject images.

At step S27 which follows, the controller 135 determines whether sound source information has changed. The sound source information is e.g. information on the number of sound sources. This process is a process of detecting a decrease in the number of sound sources arising from the fact e.g. that a vocal has stopped singing due to an interlude, etc. The change in the sound source information can be detected by the audio processing engine 170. The change in the sound source information in the following processes may also be detected by the audio processing engine 170. If the sound source information has not changed, the process goes back to step S26, while if changed, the process returns to step S5'.

On the other hand, in the case of advancing to step S28, a situation is meant where only one subject acting as a sound source exists. At step S28, using the crop technology described later, the controller 135 zooms in on and display the subject image that is only one sound source. Such display mode is referred to also as "spot display".

Subsequently, at step S29, similarly to step S27, the controller 135 determines whether the sound source information has changed. The change in the sound source information can include the case of increase in number of the sound sources and the case of decrease thereof. If the sound source information has not changed, the process goes back to step S28, while if changed, the process returns to step S5'.

Figure 9:
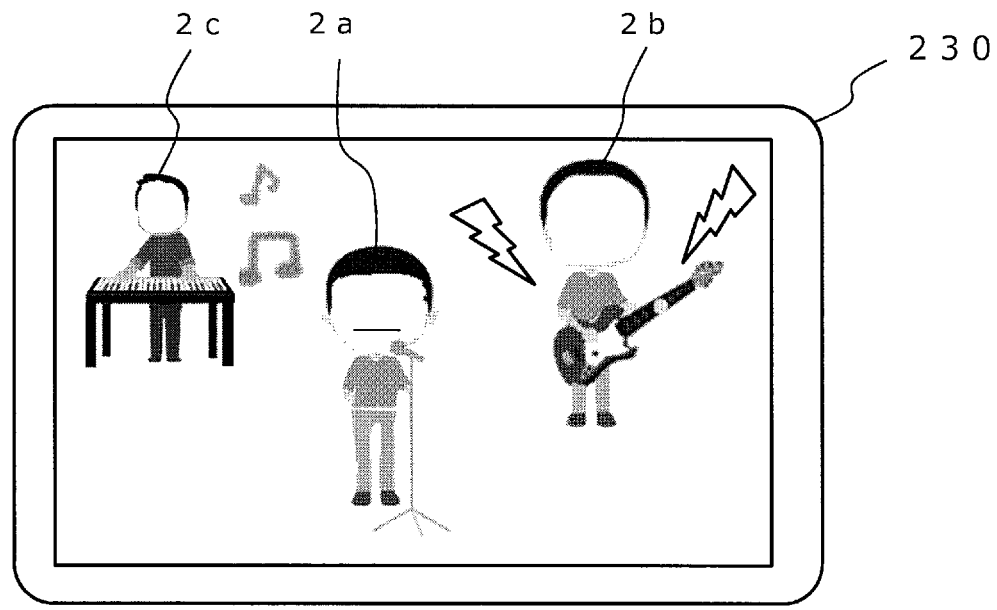
FIG. 9 is a view showing a display example of a video when a member in charge of vocal has stopped singing e.g. during an interlude of a music.

FIG. 9 shows a display example of a video when the member 1a in charge of vocal has stopped singing e.g. during an interlude of a music. The closed mouth of the subject image 2a of the member 1a is schematically shown. Although at this time three subject images are displayed on the display device 230, the number of sound sources decreases to 2. This means that the sound source present in the direction Db in the example of FIG. 4, in other words, the sound source correlated with the central area Ca of the video of FIG. 5 has no longer been detected.

If it is determined at step S25 that the coincidence number is 2 while the number of areas each including a subject image is 3, the process goes to step S30.

At step S30, the controller 135 assigns a different display priority i (i=1 to N) to each subject image. The once determined display priority i is fixed until the process of FIG. 6 returns to step S5' to again execute step S30. The details of the process at step S30 will be described later.

At step S31, the controller 135 first spot-displays a subject image with the display priority "1". For example, the controller 135 spot-displays the subject image in a display method as shown in FIG. 10.

In this embodiment, in the case that the subject image contained in the combination is a person's image and that the sound source is the person, the controller 135 cuts out the person's image from the video. On the other hand, in the case that the subject image contained in the combination is a composite image of a person and a musical instrument and that the sound source is the musical instrument, the controller 135 cuts out the composite image from the video.

For the spot display, the imaging device 100 generates a control signal for selectively displaying a subject image and transmits it to the display device 230. The control signal is a signal for selectively displaying the subject image that is a subject and that is also a sound source. For example, the control signal is a signal designating a video area including a subject image that is a subject and that is also a sound source. When receiving the control signal, the image processing engine 120 in the imaging device 100 cuts out the designated video area to display it on the display device 230.

Figure 10:
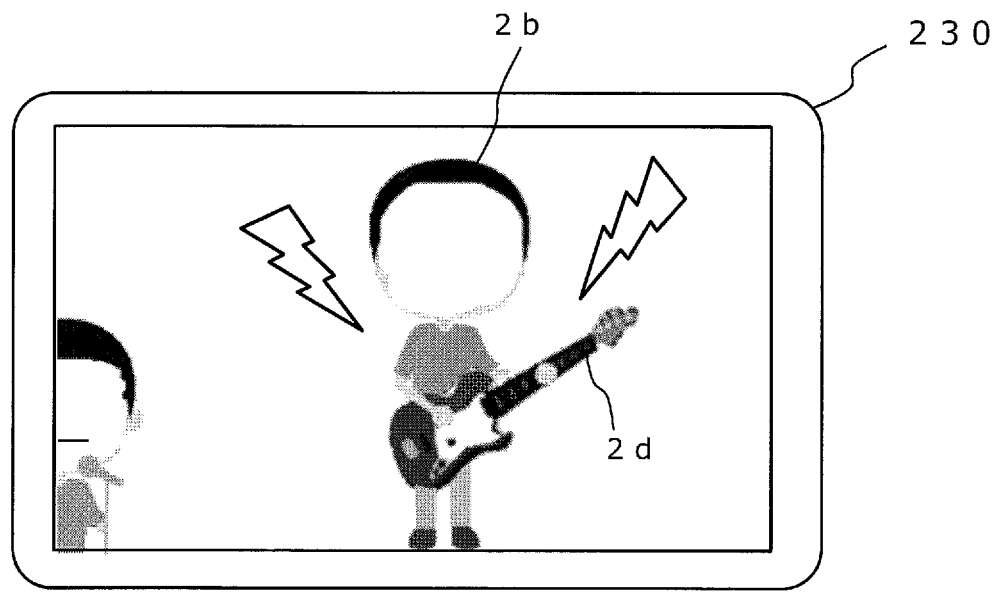
FIG. 10 is a view showing a display example when zooming in on subject images of a member and a guitar in performance on a display device.

FIG. 10 shows a display example when zooming in on the subject images 2b and 2d (composite image) of the member 1b and the guitar 1d in performance on the display device 230. For example, using the crop technology, the imaging device 100 cuts out, from a 4K resolution video, a 2K resolution video including the subject images 2b and 2d, of a size having the half number of pixels in the vertical and horizontal directions, and then displays the cut-out video on the display device 230.

At step S32 of FIG. 6, the controller 135 determines whether the sound source information has changed, similarly to steps S27 and S29. The change in the sound source information can include the case of increase in number of the sound sources and the case of decrease thereof. If the sound source information has not changed, the process proceeds to step S33, while if affirmative, the process returns to step S5'.

At step S33, the controller 135 determines whether a predetermined time previously defined has elapsed. When the predetermined time, e.g. 7 sec has elapsed, the process goes to step S34. When the predetermined has not yet elapsed, the process returns to step S31 to continue the spot display of that subject image.

Steps S34 to S36 are processes of resetting the display priority to 1 and switching the spot display again in that priority order if all the spot displays have been once finished as a result of switching the priority of the subject image to be displayed.

At step S34, the controller 135 increments the display priority by 1 and switches the subject image to be displayed.

At step S35, the controller 135 determines whether the display priority is greater than the coincidence number (N). If affirmative, the process goes to step S36, while if negative, the process goes back to step S31.

At step S36, the controller 135 resets the display priority i to 1, allowing the process to return to S31.

Steps S35 and S36 mean that the spot display is repeated again from the subject image with the display priority of 1 because, when the display priority becomes greater than the coincidence number N that is the number of subject images to be spot-displayed, it can be said that all of the subject images to be spot-displayed have been once displayed.

Figure 11:
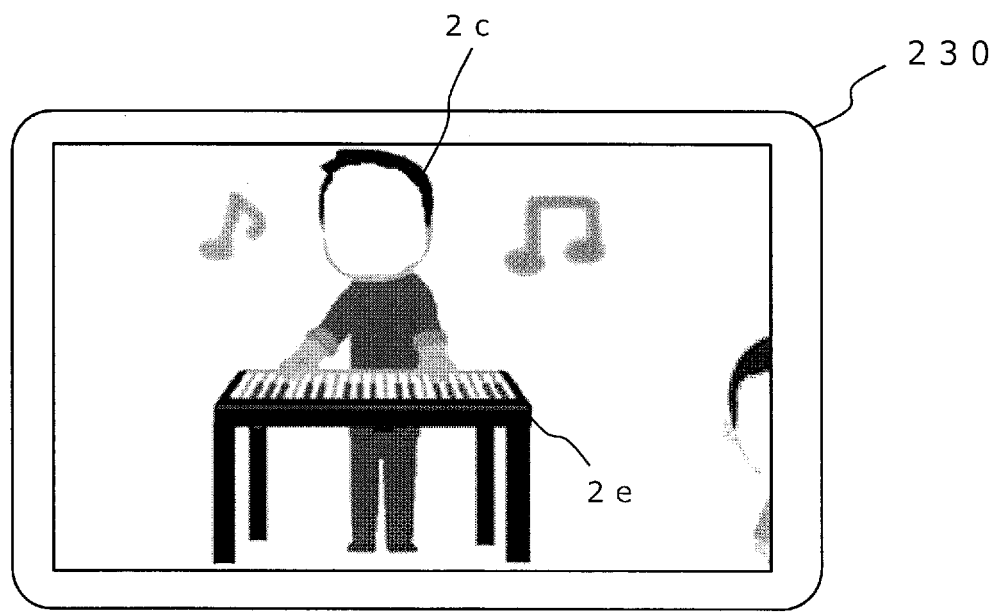
FIG. 11 is a view showing a display example when zooming in on subject images of another member and a keyboard in performance on the display device.

As shown in FIG. 10, when displaying the subject images 2b and 2d for a certain period of time, the process of the controller 135 goes through step S33 back to step S31. And, by the process at step S31, the controller 135 switches the subject image displayed by the imaging device 100. FIG. 11 shows a display example when zooming in on the subject images 2c and 2e of the member 1c and the keyboard 1e in performance on the display device 230. When the interlude is over and the member 1a in charge of vocal resumes singing, the imaging device 100 terminates the display switching. Specifically, when the controller 135 detects a change in the sound source information (step S32), it ends the display switching. The process returns to step S5', allowing the controller 135 to execute step S25 again. When at steps S5' and S25, the controller 135 detects all of the subjects are uttering or playing as sound sources, i.e. that the number of subjects is 3 with the coincidence number having become 3, the process advances from step S25 to step S26, in which the controller 135 again displays a video including all the members as shown in FIG. 8.

Figure 12:
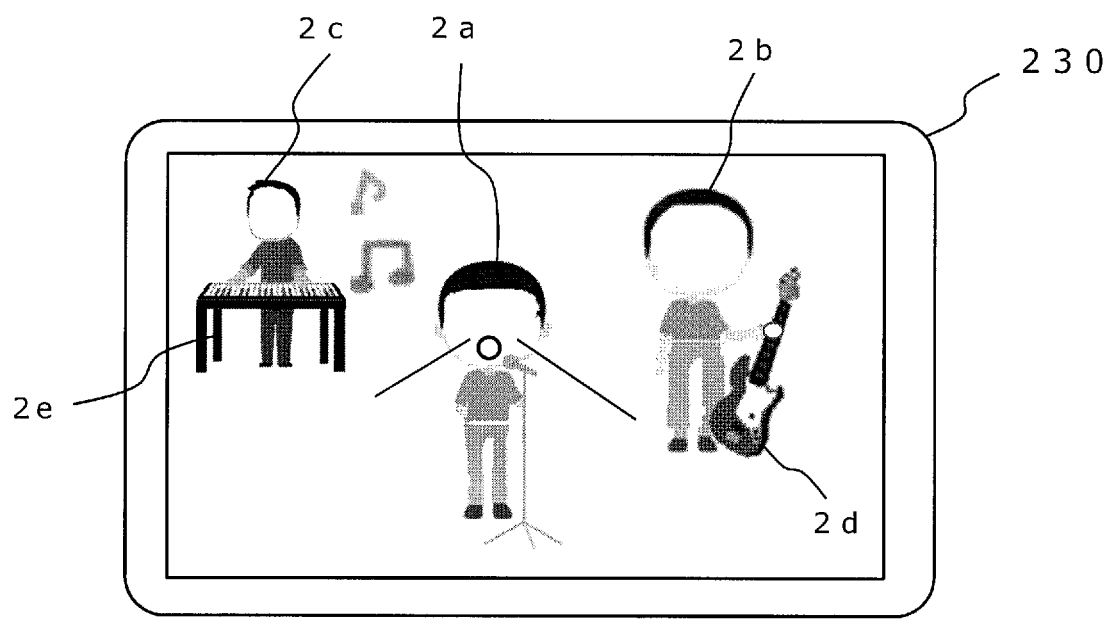
FIG. 12 is a view showing a display example of subject images when two members continue singing and playing while one member playing the guitar has interrupted playing.

FIG. 12 shows a display example of the subject images 2a to 2e when the members 1a and 1c continue singing and playing while the member 1b playing the guitar 1d has interrupted playing. Similarly to the previous example, also in this example, the imaging device 100 detects that the number of the sound sources has become 2 with respect to the three subject images. Then, the imaging device 100 generates a control signal for selectively displaying subject images and selectively displays the subject images each being a subject and also a sound source, i.e. the subject image 2a and the combination of the subject images 2c and 2e.

FIG. 7 is a flowchart of a subroutine showing a detailed processing procedure of a display priority assignment process (step S30) of FIG. 6. In this example, description will be given of an example assuming a band as shown in the example of FIG. 2. Specifically, the display priority is so set that a vocal is first spot-displayed.

At step S40, the controller 135 determines whether a vocal exists in subject images in a video.

Due to absence of the vocal, at step S41, display priorities "1" to "N" are assigned to existing subject images as appropriate. "As appropriate" means "optionally" and includes, e.g. "in descending order of subject's sound intensity level", "in ascending order of subject's distance from its position to the center of the video", and "in descending order of subject' distance from its position to the imaging device". The distance from the imaging device can be measured using a well-known ranging device, etc.

Further, at step S42, the controller 135 determines whether a plurality of vocals are present.

If negative, at step S43 the controller 135 assigns the display priority "1" to the subject image of the vocal.

At step S44, the controller 135 determines whether a subject image(s) other than the subject image of the vocal is (are) present. If present, the process goes to step S45. If not present, the subroutine comes to an end, allowing the process to return to step S31.

If affirmative at step S44, at step S45 the controller 135 appropriately assigns the display priorities "2" to "N" to subject images other than the subject image of the vocal. As a result, the subroutine terminates and the process returns to step S31.

If affirmative at step S42, at step S46 the controller 135 assigns the display priority "1" to a vocal at the central position and assigns the display priorities "2" to "M" to other vocals as appropriate.

At step S47, the controller 135 determines whether a subject image(s) other than the subject images of the vocals is (are) present. If present, the process goes to step S48. If not present, the subroutine comes to an end, allowing the process to return to step S31.

At step S48, the controller 135 assigns the display priorities "M+1" to "N" to subject images other than the subject images of the vocals as appropriate.

Through the above processes, the display priority can be assigned to each of the subject images.

With reference to FIGS. 2 to 12, the example has been described where uttering or playing subjects are individually zoomed in on while a plurality of band members are identified as subjects. As regards an example of zooming in individually, if applied to a conference system where a plurality of participants gather in a conference room and each speak at any time, the speakers can be selectively zoomed in on. As a result, participants (viewers) from remote locations can be provided with a suitable viewing environment. This is because, since a speaking participant is automatically zoomed in on, there is no need for participants at remote locations to search, from the movement of the mouth on the video, who is currently speaking in the conference room. At a conference where only a few or one participant is likely to speak, the speaker is automatically spot-displayed, whereupon it can be said that viewing becomes very easy.

3. Effects, etc.

In this embodiment, the signal processing device implemented as the imaging device 100 comprises the input interface, the image processing engine 120 as an example of the image processor, the audio processing engine 170 as an example of the audio processor, and the controller 135 as an example of the controller. The input interface receives video and audio signals acquired concurrently in the space S where subjects exist. The image processing engine 120 recognizes subject images included in the video, to determine a first type of area where each of the subjects exists. The audio processing engine 170 recognizes sound sources included in the audio, to determine a second type of area where each of the sound sources exists in the space. Using the first type of area and the second type of area, the controller 135 determines a combination of a subject and a sound source whose positions coincide, to selectively determine a subject image to be output corresponding to the combination. This makes it possible to select a subject coinciding in position with the sound source, i.e. a subject making a sound. For example, the controller 135 causes the display device to display such a subject, whereby video switching suitable for viewers can be achieved in an unmanned manner.

In this embodiment, in the case that the combination of a subject image and a sound source is one combination, the controller 135 selectively determines a subject image to be output corresponding to the one combination. For example, the controller 135 selects only one subject making a sound to cause the display device to display the subject, whereby video switching suitable for viewers can be achieved in an unmanned manner.

In this embodiment, in the case that the combination of a subject image and a sound source includes a plurality of combinations and that the plurality of combinations are not combinations of all subject images and all sound sources, the controller 135 outputs a subject image corresponding to each of the plurality of combinations in a predetermined order of priority. By the controller 135 causing a plurality of subjects each making a sound to be displayed in the predetermined order of priority, video switching suitable for viewers can be achieved in an unmanned manner.

In this embodiment, the image processing engine 120 and the audio processing engine 170 update the first type of area where subjects exist and the second type of area where sound sources exist, following changes in video and audio. The controller 135 updates the combinations of a subject image and a sound source which coincide in position by using the updated first type of area and the second type of area and selectively outputs subject images corresponding to the updated combinations. Even if the position of the subject and the position of the sound source have moved, the controller 135 can select a subject making a sound and cause the display device to display the subject. In consequence, unmanned video switching suitable for viewers can be achieved.

In this embodiment, in the case that the combination of a subject image and a sound source includes a plurality of combinations and that the plurality of combinations are combinations of all subject images and all sound sources, the controller 135 outputs all subject images corresponding to all subjects. In the case that all the subjects make a sound, a video including all the subject images can be output.

In this embodiment, the controller 135 issues an instruction to cut out a subject image included in a combination from a video. For example, the image processing engine 120 can cut out a subject image in accordance with the instruction. This enables the cut-out subject image to be selectively displayed.

In this embodiment, in the case that the subject image included in a combination is a person's image and that the sound source is the person, the controller 135 cuts out the person's image from a video. On the other hand, in the case that the subject image included in a combination is a composite image of a person and a musical instrument and that the sound source is the musical instrument, the controller 135 cuts out the composite image from the video. By changing the image to be cut out depending on whether the subject image is an image of a person making a sound or a composite image of a person and a musical instrument, unmanned video switching suitable for viewers can be achieved.

The signal processing device of this embodiment further comprises an output interface that outputs to the outside a signal of a subject image included in a selectively determined combination. This enables the subject image to be selectively output to e.g. the external display device 230.

Second Embodiment

In the first embodiment, the signal processing device has been implemented using the imaging device 100 of FIG. 1. In a second embodiment, description will be given of: a signal processing system including a plurality of imaging devices (e.g. imaging devices 100 of FIG. 1) and allowing at least one thereof to act as the signal processing device; or a signal processing system including a plurality of imaging devices and a signal processing device disposed separately therefrom. The signal processing system achieves unmanned video switching suitable for viewers. In this embodiment, the video display mode switching processing is implemented based on FIGS. 3, 6, and 7, similarly to the first embodiment.

Figure 13A:
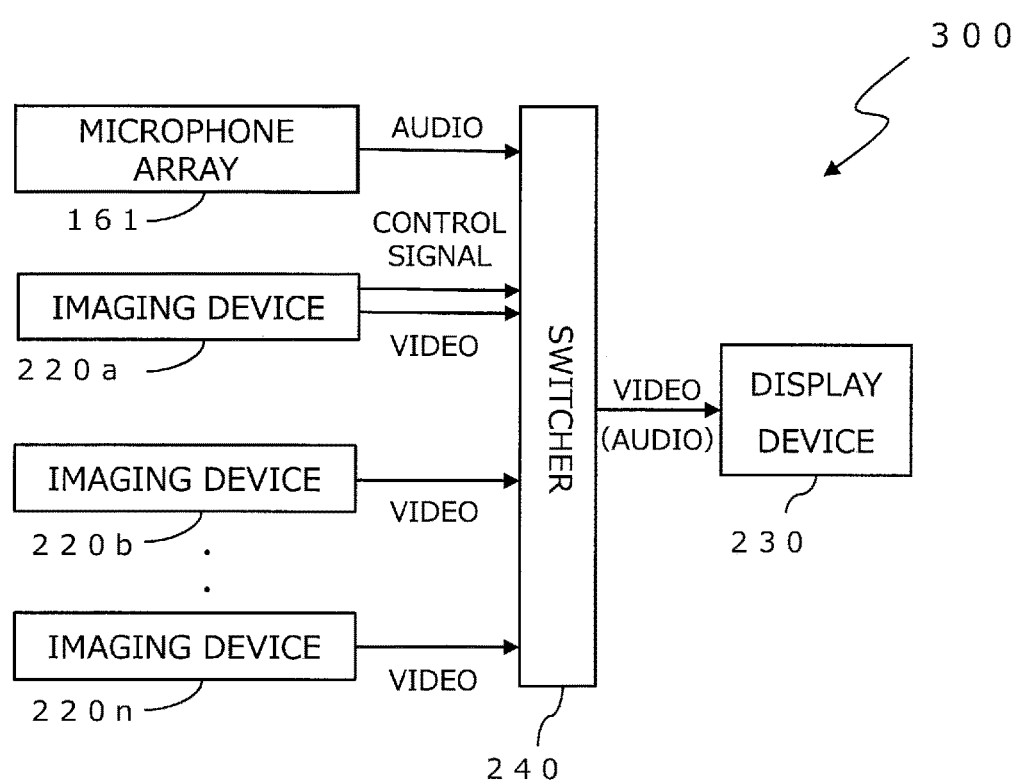
FIG. 13A is a hardware diagram showing a first configuration example of a second embodiment of the signal processing system.

FIG. 13A is a hardware diagram showing a configuration of this embodiment of a signal processing system 300. In the example of FIG. 13A, a signal processing device 220*a* and a plurality of imaging devices 220*b* to 220*n* each perform capturing to output a video. The configuration of each of the signal processing device 220*a* and the imaging devices 220*b* to 220*n* is the same as that of the imaging device 100 shown in FIG. 1 for example.

A video output from each of the signal processing device 220*a* and the imaging devices 220*b* to 220*n* is input to a switcher 240. An audio output from the microphone array 161 is also input to the switcher 240. The audio may be transmitted from the microphone array 161 directly to the signal processing device 220*a*.

In the signal processing system 300, the signal processing device 220*a* is set as a "master camera". Hereinafter, regarding the example of FIG. 13A, the signal processing device 220*a* is written also as "master camera 220*a*" or "imaging device 220*a*". A video output from the master camera 220*a* is used for detection of subjects when performing the determination process of the present disclosure, i.e. the process of determining coincidence/non-coincidence between the number of subjects and the number of sound sources. That is, the video of the master camera includes all of subject images to be displayed. The master camera corresponds to the imaging device 100 shown in FIG. 2.

The other imaging devices 220*b* to 220*n* each have a previously defined area or range to be imaged in the space S, while the master camera 220*a* previously holds information indicative of the range.

In this embodiment, the master camera 220*a* serves as the signal processing device that carries out the above determination process described in the first embodiment. When switching the subject image to be output to and displayed on the external display device 230 in a predetermined order of priority as a result of the above determination process, a video of one of the imaging devices 220*a* to 220*n* is adopted that has been selected by the switcher 240 in accordance with the control signal from the master camera 220*a*. This means that a video of the master camera 220*a* (imaging device 220*a*) can also be an object of adoption.

Figure 13B:
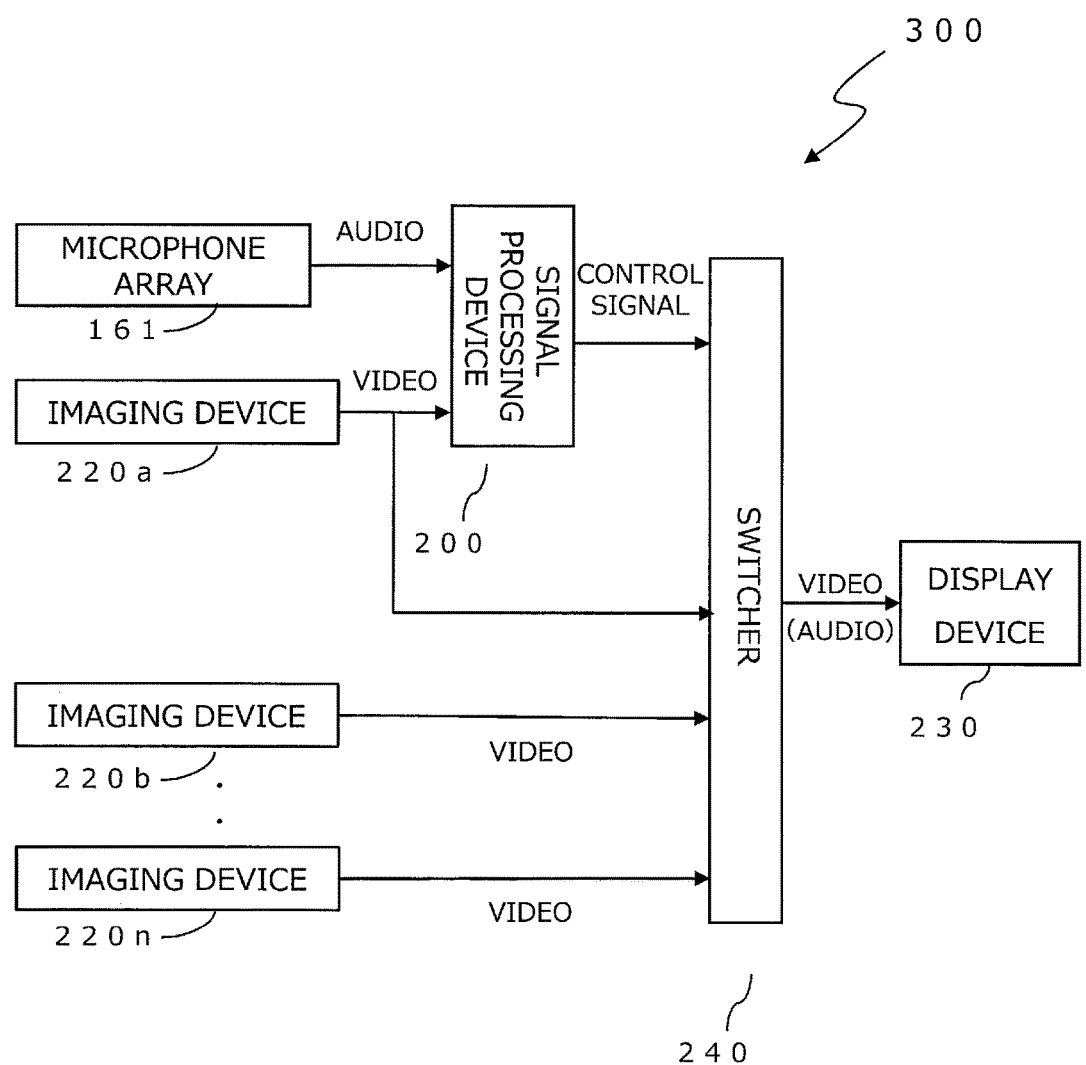
FIG. 13B is a hardware diagram showing a second configuration example of the second embodiment of the signal processing system.

It is to be noted in FIG. 13A that the microphone array 161 within the master camera 220*a* may be used instead of using the external microphone array 161. Furthermore, a configuration is also possible where the master camera 220*a* does not serve as the signal processing device. The configuration of FIG. 13B is an example thereof. The signal processing system 300 of FIG. 13B uses a signal processing device 200 and a plurality of imaging devices 220*a* to 220*n*. At this time, the imaging device 220*a* acting as the master camera is disposed so as to image all of subjects in the space S. An audio of the microphone 161 and a video of the imaging device 220*a* are input to the signal processing device 200. The signal processing device 200 transmits a control signal to the switcher 240 so that any videos input from the imaging devices 220*a* to 220*n* to the switcher 240 are output to the display device 230.

Figure 14:
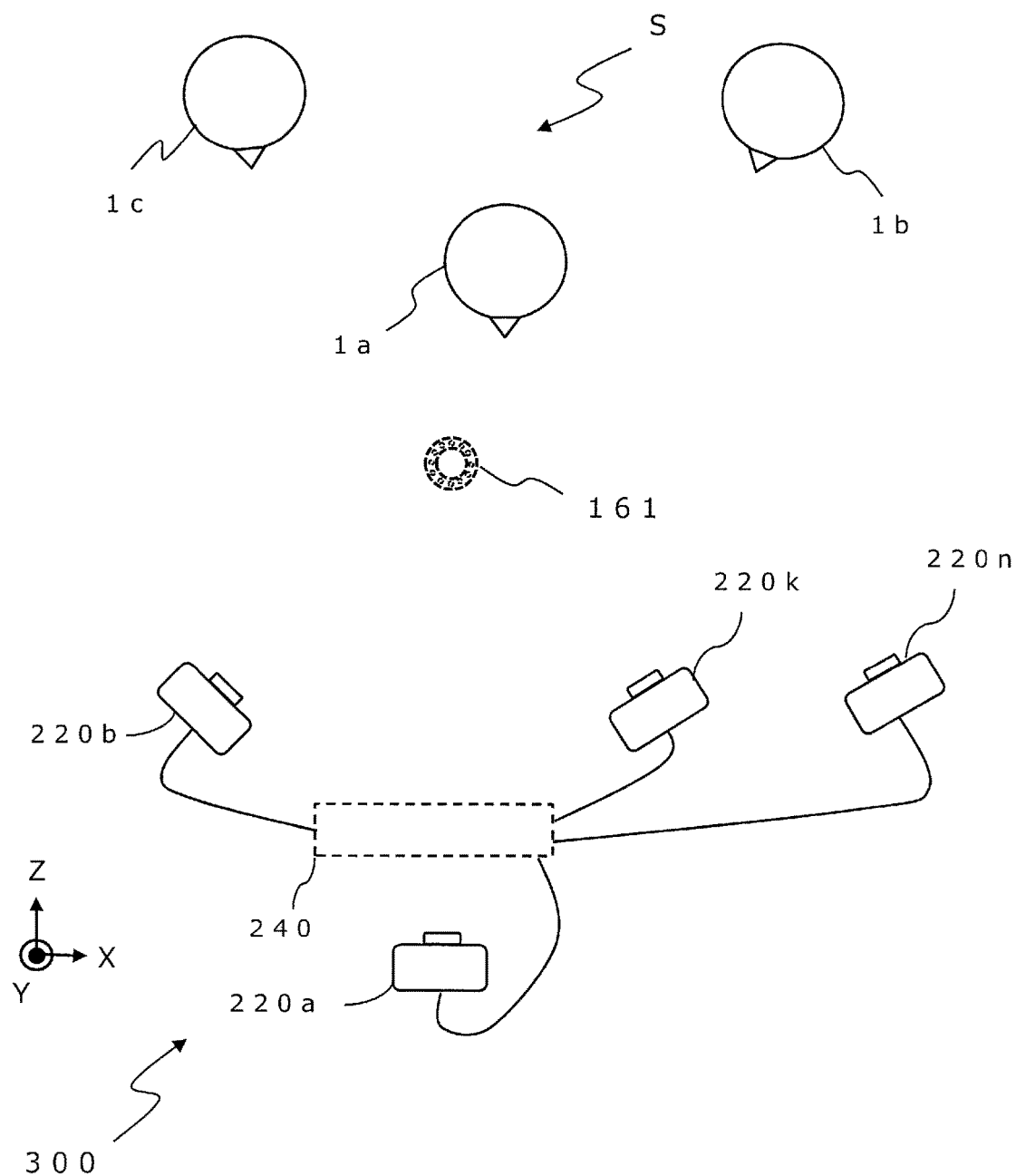
FIG. 14 is a view showing an installation example of the signal processing system according to FIG. 13A.

FIG. 14 is a view showing an installation example of the signal processing system 300 according to FIG. 13A. FIG. 14 shows a configuration seen when looking down from the +Y side (ceiling side) to the −Y side (floor side). In FIG. 14, the display device 230 is not shown.

Typically, the imaging devices 220*a* to 220*n* are fixedly disposed in the space S, with their fields of view being also each fixed. The master camera 220*a* is set to have an angle of view capable of imaging all of the band members 1*a* to 1*c*, while the imaging devices 220*b* to 220*n* are each set to have an angle of view capable of imaging each band member. The master camera 220*a* can previously acquire information on which area in the space S is included in the field of view of each of the imaging devices 220*b* to 220*n*. Using videos acquired by the imaging devices 220*b* to 220*n*, the master camera 220*a* can determine which area of subject image to output.

For example, in the case of causing the display device 230 to selectively display the subject image 2b shown in FIG. 10, the signal processing device of the master camera 220a determines an imaging device set in advance for an area in which the subject image 2b exists, e.g. the imaging device 220b among the imaging devices 220b to 220n, to transmit a control signal to the switcher 240. The switcher 240 receives the control signal and transmits a video output from the imaging device 220b, to the display device 230. This enables the display device 230 to display a subject image included in an area similar to that of the example shown in FIG. 10. Transmitting a video output from the predetermined imaging device 220b to the display device 230 by use of the switcher 240 in this manner is said as controlling the switcher 240.

In this embodiment, the control signal output from the signal processing device is not a signal for cutting out a 2K video from a 4K video, but is a signal instructing the selection of a video of an imaging device capturing a desired subject image.

In the case of presence of a plurality of subject images to be switchingly displayed, the signal processing device of the master camera 220a transmits a control signal to the switcher 240 after the elapse of a predetermined period of time, allowing transmission of a video of another imaging device to the display device 230. For example, in the case of causing the display device 230 to selectively display the subject image 2c shown in FIG. 11, the signal processing device of the master camera 220a determines an imaging device 220k and transmits a control signal to the switcher 240. This achieves switching to a video including the subject image 2c.

Other Embodiments

Figure 18:
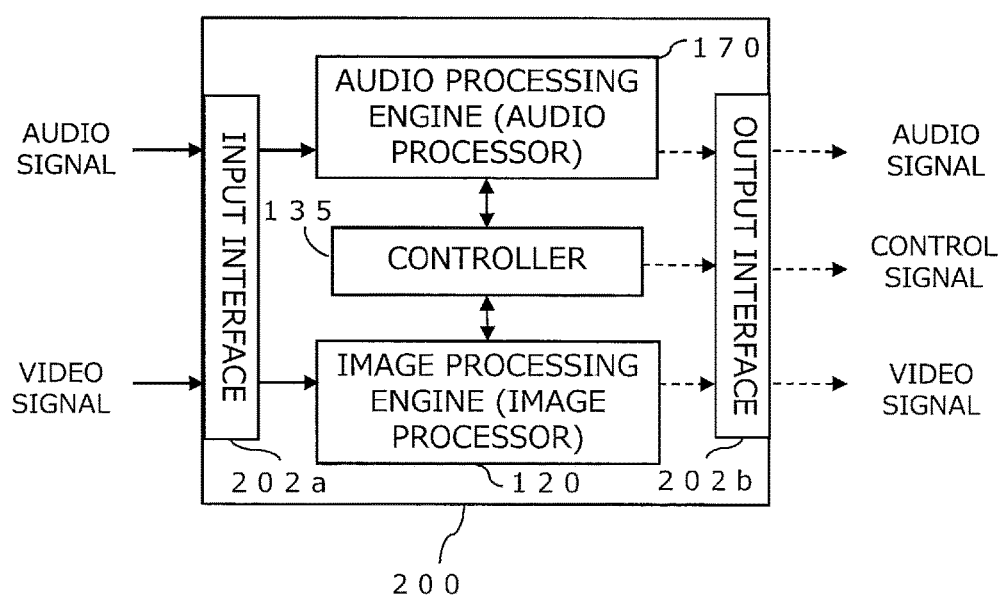
FIG. 18 is a hardware configuration diagram showing a configuration of a semiconductor chip acting as the signal processing device.

In the first embodiment, the signal processing device has been implemented by using the imaging device 100, whereas in the second embodiment, the signal processing device has been implemented by using the imaging device 220a. The signal processing device need not have an imaging function. As shown in FIG. 18, among the constituent elements of the imaging device 100, the controller 135, the image processing engine 120, and the audio processing engine 170 can be mounted as the signal processing device 200, e.g. in the form of one semiconductor chip. The signal processing device 200 may include an input interface (input unit) 202a for accepting data from the outside of the signal processing device 200 and an output interface (output unit) 202b for outputting data to the outside thereof. The input interface 202a and the output interface 202b can be e.g. terminals or pins for signal input/output. In the case that the signal is output from the controller 135, the output interface 202b can be a terminal or a pin of the controller 135. The signal processing device may be configured by incorporating the semiconductor chip of FIG. 18 into another device other than the imaging device 100.

Although in the above embodiments the signal processing device has been described using the digital camera as an example of the imaging device, the signal processing device of this embodiment may be an interchangeable lens digital camera. The idea of the present disclosure may be applied not only to the digital camera but also to a movie camera, and can also be implemented by a camera-equipped mobile phone or electronic equipment like PC having various imaging functions.

Although in the first embodiment the imaging device 100 has been described as the signal processing device cutting out a subject image to be displayed or streamed based on the crop technology, this is not limitative. For example, the signal processing device need not include the microphone array 161 and the image sensor 115, but may be configured to have an input interface that receives video and audio signals acquired concurrently in the same space by an external image sensor and microphone array and an output interface that outputs signals of subject images included in a combination determined selectively, to the outside.

Although in the above embodiments the video display mode switching process has been described with reference to FIGS. 6 and 7, an algorithm may be employed that implements other display mode switching.

Although in the first and second embodiments the subject coordinates and the sound source coordinates are two-dimensional coordinates, they may be three-dimensional coordinates without being limited to the two-dimensional coordinates. For example, the coordinate value in the depth direction of the subject coordinates is found obtained by using the camera DFD technology or by using a distance sensor. The coordinate value in the depth direction of the sound source coordinates is found by utilizing time differences when sound from the same sound source arrives at a plurality of microphones. By representing each of the subject coordinates and sound source coordinates including the coordinate value in the depth direction (Z-axis direction) found by such a method as the three-dimensional coordinates, it is possible to determine with higher accuracy a combination of a subject and a sound source in which a first type of area including each subject and a second type of area including each sound source overlap. As used herein, the "area" need not necessarily be defined by coordinate values in the three-dimensional space S, but includes a part of a plane e.g. of the ground in the space S or a partial space in the space S. The imaging device 100 may acquire and process the position of a subject and the position of a sound source as different types of area represented three-dimensionally in the space S.

Although in the above embodiments a vocal or a player has been intended to be selectively and individually output and displayed, this is not limitative. For example, the following selective display method is also conceivable. That is, the imaging device 100 calculates a distance on video between subject images selectively displayed as in the examples of FIGS. 10 and 11 and determines whether the distance lies within a predefined range. If affirmative, then the imaging device 100 generates a control signal for cutting out those subject images all at once to perform selective display.

Figure 17:
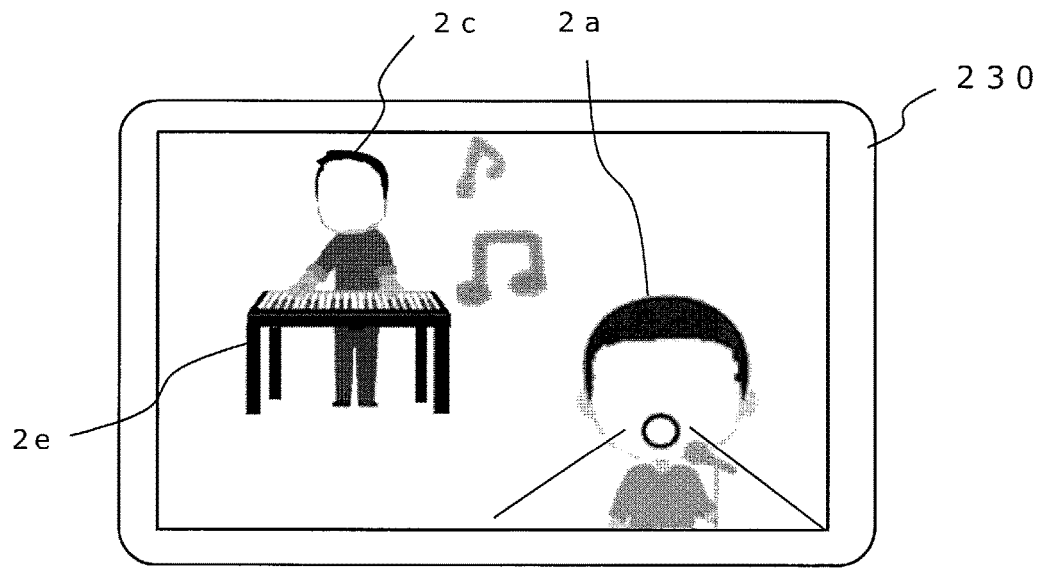
FIG. 17 is a view showing a display example obtained when selectively cutting out a plurality of subject images, the distance on video between which lies within a predefined range.

FIG. 17 shows a display example obtained when selectively cutting out the subject image 2a and the combination of the subject images 2c and 2e, the distance on video between which lies within a predefined range. The imaging device 100 not only performs the process of displaying individual subject images in sequence, but also can display the subject images all at once when it can be said that the subject images exist within a relatively short distance range on video. This can provide a viewing environment suitable for viewers while imparting various video effects to viewers.

The example of FIG. 17 also shows that the display range of the subject image 2a of the singing member 1a differs from the display range of the combined subject image of the subject image 2c and the keyboard's subject image 2e. Specifically, regarding the subject image 2a, the upper body including the face part of the subject image 2a is displayed, whereas the combined subject image of the subject images 2c and 2e are displayed with the range including the whole thereof. The reason to make such difference is because the subject images to be displayed as sound sources differ in size. When the sound source is the singing member 1a, the essential sound source is the mouth of the member 1a and hence it is presumed that viewers want to zoom in on generally the face portion or the face and upper body for viewing. On the other hand, when the sound sources are the member 1c and the keyboard 1e, the essential sound source is the keyboard 1e and therefore it is presumed that viewers want to view the keyboard 1e and the member 1c playing the keyboard 1e. That is, the type of a sound source can be an indicator for determining the size of a subject image including the sound source to be displayed.

Thus, in this variant, after determining the type of a sound source, the range and/or the size of a subject image to be displayed was changed depending on the type of the sound source. Specifically, the audio processing engine 170 determines the type of a sound source included in an audio. The controller 135 generates a control signal for displaying a subject image contained in the combination with a display method that depends on the sound source type determined by the audio processing engine 170. For example, in the case that the sound source is a person, the controller 135 adopts such a display method that allows a subject image of the person corresponding to the sound source to include at least the head including the mouth of the person or the upper body thereof. In the case that the sound source is a guitar, the controller 135 adopts such a display method that allows at least a subject image including the guitar and the guitar player to be displayed.

This process is applicable not only to the examples of FIGS. 10 and 11 but also to those of FIGS. 8 and 9. For instance, in the case of the example of FIG. 8, when the sound source is determined to be the guitar 1d from the acquired audio/instrument sound, display is made on the display device 230 with a size including at least the subject image 2d of the guitar 1d.

Figure 15:
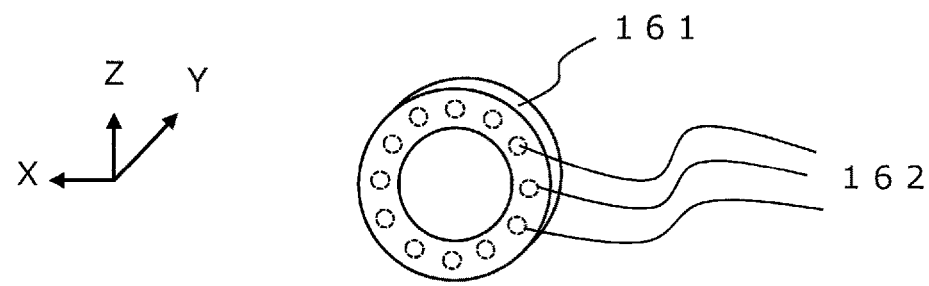
FIG. 15 is a front view showing a configuration example of a microphone array that includes four or more annularly arranged microphone elements.
Figure 16:
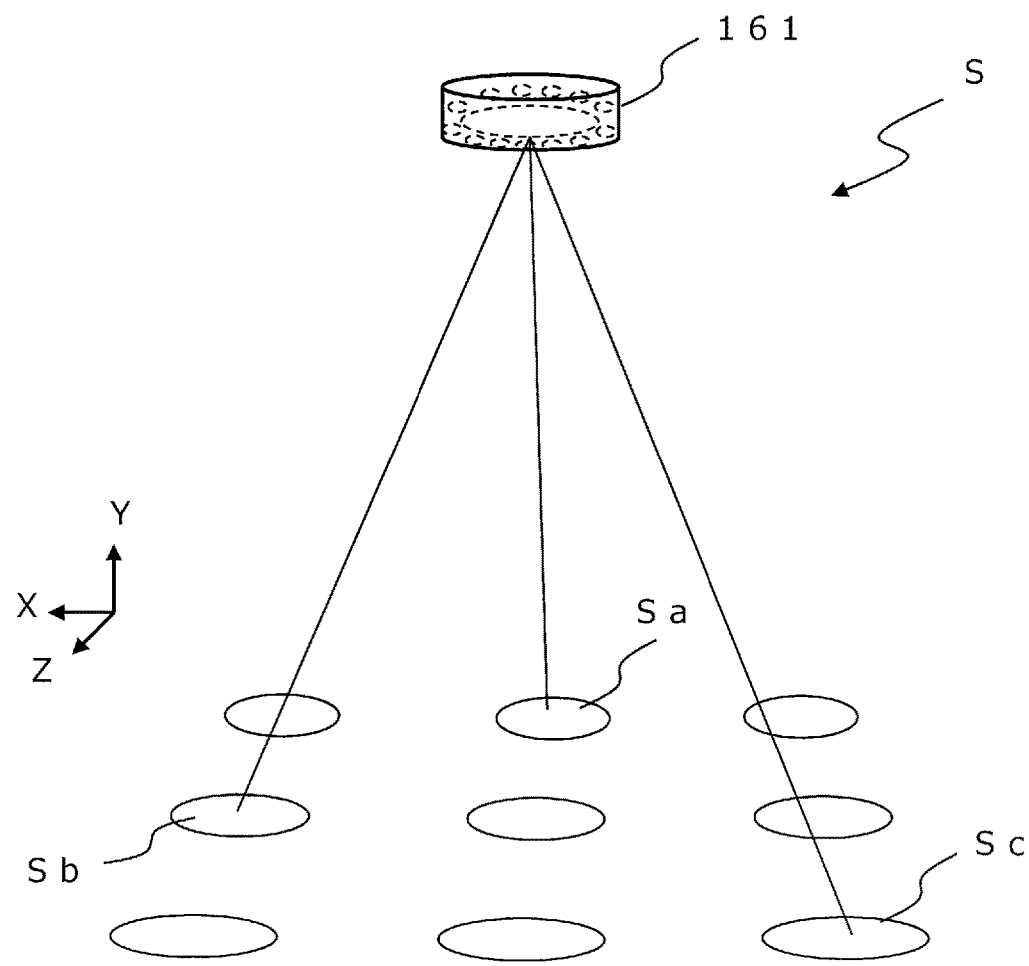
FIG. 16 is a view showing an example of installation of the microphone array in a space.

Although in the first embodiment the example has been shown that uses the three microphone elements shown in FIGS. 2 and 4, this is not limitative. Depending on the microphone array used there is a configuration capable of detecting the position of a sound source in more detail. FIGS. 15 and 16 show a configuration example of the microphone array 161 that includes four or more annularly arranged microphone elements 162.

FIG. 15 is a front view of the microphone array 161, and FIG. 16 is a view showing an example of installation of the microphone array 161 in the space S. For example, the microphone array 161 is arranged on the ceiling, whose output audio signal is transmitted wiredly or wirelessly to the imaging device 100.

Compared with the example using the three microphone elements shown in FIGS. 2 and 4, the direction of arrival of voice or musical instrument sound can be estimated more accurately by using output audio signals from the four or more annularly arranged microphone elements 162. According as more microphone elements 162 are used, the estimation accuracy of the direction of arrival becomes higher. In other words, the position or the direction in which a sound source exists can more accurately be identified. For example, as shown in FIG. 16, it is possible by increasing the number of the microphone elements 162 to identify the respective positions Sa to Sc of the band members 1a to 1c singing and playing in the space S. The process of determining the position can be implemented by any one of the above techniques such as using the arrival time difference.

Although in the above embodiments the example has been described where a band performance video is live streamed, the present disclosure is not limited thereto, but is widely applicable to another use case in which subjects play musical instruments or utters. As an example, the present disclosure can also be applied to live streaming of orchestral performances and live streaming of dramas. As another example, it is also widely applicable to use cases in nursery schools, kindergartens, elementary schools, etc. In the schools, etc., there are many opportunities to sing alongside on the stage. In the case that a video recorded by a parent with a video camera (imaging device) is viewed afterward on a television at home, use of the technique of the present disclosure renders it possible to provide a viewing environment suitable for the family (viewers). For example, it is possible to sequentially cut out and display singing pupils or to collectively cut out and display singing pupils standing on the right half of the stage.

In this embodiment, the example has been given where using the crop technology, a 2K resolution video is cut out from a 4K resolution video for zooming in. A specific subject image can be displayed in a relatively emphasized manner, i.e. selectively by, instead of zooming-in display of the specific subject image: reducing the brightness of subject images other than the specific subject image and/or of the background image; changing the depth of field to create blur; or graying out while imparting transparency. Accordingly, any display mode in addition to cutting off is within the scope of the present disclosure as long as the subject image can selectively be displayed.

As above, the embodiments have been described as exemplifications of the technique of the present disclosure. To that end, the accompanying drawings and the detailed description have been provided.

Accordingly, the constituent elements described in the accompanying drawings and the detailed description may include not only components essential for problem solving but also components not essential to solve the problem for the purpose of exemplification of the above technique. For that reason, immediately from the fact that those unessential components are described in the accompanying drawings and the detailed description, those unessential components should not be construed as being essential.

Since the above embodiments are intended to exemplify the technique of the present disclosure, various changes, permutations, additions, omissions, etc. can be made without departing from the scope of claims or the scope of equivalents thereof.

The present disclosure is applicable to a system, etc. adopting a technique imaging while acquiring audios.

What is claimed is:
1. A signal processing device comprising:
an input interface that receives signals of a video and an audio acquired concurrently in a space where subjects exist;
an image processor that recognizes subject images included in the video, to determine a first type of area where each subject exists; and
an audio processor that recognizes sound sources included in the audio, to determine a second type of area where each sound source exists in the space,
wherein the image processor determines the first type of area where each subject exists independently of the second type of area where each sound source exists determined by the audio processor, and the audio processor determines the second type of area where each sound source exists independently of the first type of area where each subject exists determined by the image processor; and a controller that uses the first type of area and the second type of area to judge coincidence or non-coincidence between a position of the each subject and a position of the each sound source, to determine a combination of a subject and a sound source whose positions coincide with each other, the controller selectively determining the subject image to be output that corresponds to the combination.

2. The signal processing device of claim 1, wherein when combination of the subject image and the sound source is one combination, the controller selectively determines the subject image to be output that corresponds to the one combination.

3. The signal processing device of claim 1, wherein when combination of the subject image and the sound source includes a plurality of combinations and the plurality of combinations are not combinations of all subjects and all sound sources, the controller outputs the subject image corresponding to each of the plurality of combinations in a predetermined order of priority.

4. The signal processing device of claim 1, wherein the image processor and the audio processor follow changes in the video and the audio, respectively, to update the first type of area where the each subject exists and the second type of area where the each sound source exists, and wherein the controller uses the updated first and second types of areas to update the combination of the subject image and the sound source in which the subject and the sound source coincide in position, and selectively outputs the subject image that corresponds to the updated combination.

5. The signal processing device of claim 1, wherein when combination of the subject image and the sound source includes a plurality of combinations and the plurality of combinations are combinations of all subjects and all sound sources, the controller outputs all subject images corresponding to the all subjects.

6. The signal processing device of claim 1, wherein the controller issues an instruction to cut out the subject image contained in the combination from the video.

7. The signal processing device of claim 6, wherein when the subject image contained in the combination is an image of a person and the sound source contained therein is the person, the controller cuts out the image of the person from the video, and wherein when the subject image contained in the combination is a composite image of a person and a musical instrument and when the sound source is the musical instrument, the controller cuts out the composite image from the video.

8. The signal processing device of claim 6, wherein when combination of the subject image and the sound source includes two combinations and a distance between areas including two subject images contained in the two combinations is within a predefined range, the controller cuts out the two subject images.

9. The signal processing device of claim 1, further comprising:

an output interface that outputs a signal of the subject image contained in the combination selectively determined.

10. The signal processing device of claim 1, wherein the controller selectively determines the subject image to be output depending on the number of the combinations.

11. A signal processing system comprising:

the signal processing device of claim 1;

a plurality of imaging devices, each of which images the space to generate a signal of the video; and a switcher that selects a video including the selectively determined subject image, from among the videos output from the signal processing device and the plurality of imaging devices, wherein the signal processing device comprises an imager that images a plurality of subjects lying in the space to create a video including a plurality of subject images, each of the plurality of imaging devices images an individual subject to create a video including an individual subject image, and the controller of the signal processing device controls the switcher to selectively output the subject image contained in the combination.

* * * * *